(12) United States Patent
Kadarkarai

(10) Patent No.: US 9,305,076 B1
(45) Date of Patent: Apr. 5, 2016

(54) FLATTENING A CLUSTER HIERARCHY TREE TO FILTER DOCUMENTS

(71) Applicant: GOOGLE INC., Mountain View, CA (US)

(72) Inventor: Jayaprabhakar Kadarkarai, Hyderabad (IN)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 13/836,970

(22) Filed: Mar. 15, 2013

Related U.S. Application Data

(60) Provisional application No. 61/665,502, filed on Jun. 28, 2012.

(51) Int. Cl.
*G06F 17/30* (2006.01)

(52) U.S. Cl.
CPC ................ *G06F 17/30598* (2013.01)

(58) Field of Classification Search
CPC ................................ G06F 17/30598
USPC ........................................ 707/738
See application file for complete search history.

(56) References Cited

U.S. PATENT DOCUMENTS

| 2013/0006996 A1 | 1/2013 | Kadarkarai | |
| 2013/0246422 A1* | 9/2013 | Bhargava et al. | 707/737 |

* cited by examiner

*Primary Examiner* — Huawen Peng
(74) *Attorney, Agent, or Firm* — Lerner, David, Littenberg, Krumholz & Mentlik, LLP

(57) ABSTRACT

In an automatic electronic discovery search tool, documents can be clustered into a cluster hierarchy according to a first clustering approach. Once a hierarchy tree is created, portions of the tree can be flattened for application of a second superior clustering approach. Clustered portions may be used in a document review tool or further filtered according to specified criteria. Clusters may be filtered or used in a document review tool.

18 Claims, 8 Drawing Sheets

FLATTENING A CLUSTER HIERARCHY TREE TO FILTER DOCUMENTS

CROSS-REFERENCE TO RELATED APPLICATIONS

This application claims the benefit of U.S. Provisional Appl. No. 61/665,502, filed Jun. 28, 2012, which is hereby incorporated by reference in its entirety.

BACKGROUND

Electronic discovery tools allow corporations and other companies to review documents to be used in litigations and other proceedings. As businesses rely on computers more and more, the amount of documents produced in a given litigation quickly grows in size. Managing large document repositories and effectively reviewing the documents poses many issues to law firms and their clients.

Grouping documents according to a common theme allows reviewers to become knowledgeable about the particular theme of the document they are reviewing, and allows for faster and more accurate review. Additionally, grouping documents together allows for certain bulk operations, such as discarding of a large group of documents that are very likely to be not relevant to the litigation.

BRIEF SUMMARY

Embodiments of the present invention relate to clustering documents relevant to a subject. In one embodiment, a method of clustering a set of documents relevant to a subject is disclosed. Documents are clustered according to a partitional clustering approach to create a cluster hierarchy. One or more branches or levels of the cluster hierarchy are selectively flattened. Using an agglomerative clustering approach, the flattened branches of the cluster hierarchy are re-clustered.

Further embodiments, features, and advantages, as well as the structure and operation of the various embodiments are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Electronic discovery tools are now used in the vast majority of modern litigations. Conventionally, a vendor will collect a set of electronic documents from a business facing a litigation or threat of litigation, and load the documents into a database for further analysis. Analysis may include sorting the documents, filtering them according to a query, or partitioning them to be reviewed by specific reviewers.

One useful analysis method is to group documents according to a certain theme or other criteria. Grouped documents can then be reviewed together, such that documents related to a particular criteria are all reviewed at the same time. This eliminates the need for a reviewer to keep track of multiple concepts at once. Instead, a reviewer can focus on one concept for a grouped set of documents, and move on to another group related to another concept.

In a large business, a set of collected documents may number from thousands to millions of documents. These large sets of documents pose many issues. Database performance on large numbers of documents degrades quickly. Analysis on even a relatively small set of documents may take hours or even days for a relatively simple goal, such as determining a count of instances of a particular phrase.

In order to group a set of documents, clustering routines may be used to create clusters of related documents. Clustering routines utilize a measure of similarity between two or more documents and aim to group the most similar documents together into one or more clusters.

Clustering on text may start by analyzing text documents to determine word counts. Documents may be then clustered together based on the word count statistics. For example, three documents that frequently mention the term "patent" may be clustered together, while four documents that frequently mention the word "copyright" may be clustered together, separate from the "patent" set.

Figure 1:
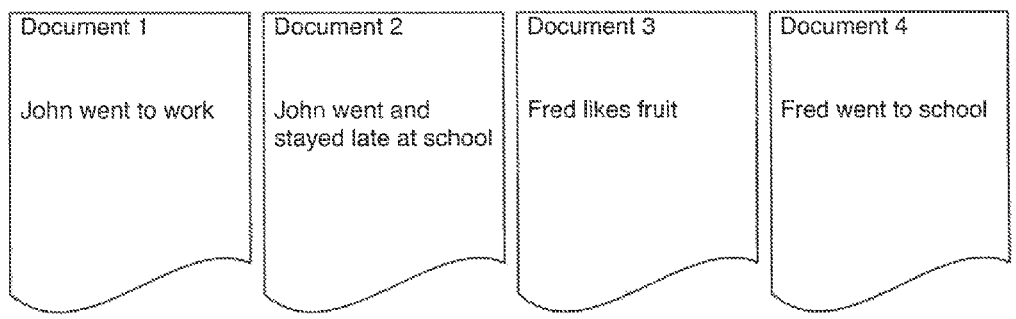
FIG. 1 is an illustration of a term-document incidence matrix.

Clustering documents depends on the similarity between two documents. In many clustering algorithms, statistics regarding word frequency and presence in a document are used to compare documents. Documents may be represented as vectors of the words contained in each document. A term-document incidence matrix may be created to represent each document in a matrix. For example, a matrix may represent each document as a column, and each word contained in all of the documents as a row. The matrix may omit common words such as "to" or "and", since these words may be present in many documents. The intersection of each document column and each word row contains a value indicating whether the particular word is contained in the document. This value is entered for each document contained in the set to be clustered. A portion of a term-document index is shown in FIG. 1 for four exemplary documents.

Once the term-document incidence matrix is created, each column may be considered as a vector representation of a particular document. In order to compare two documents and determine similarity between documents, a similarity calculation may be performed. Each document vector may be represented in a vector space model. To determine the similarity between two documents, a similarity measure, such as the cosine similarity, may be calculated. A cosine similarity function determines the cosine of the angle between two vectors, such as document vectors, and returns values between zero and 1. A value of zero indicates that the two documents are entirely dissimilar, while a value of 1 indicates that the two documents are identical.

Hierarchical clustering creates a representation of clusters in a tree form with a central node or root and branches that stem from the root. Branches represent sub-trees connected to the root and leaf nodes. A leaf may represent individual documents or a cluster, depending on the level of clustering applied. Sub-trees themselves may represent a hierarchy of clusters of documents. The two main methods of hierarchical clustering are known as top-down clustering and bottom-up clustering.

Bottom-up clustering may also be known as agglomerative clustering. In document clustering, agglomerative clustering routines start with the individual documents of the set to be clustered. Based on their similarities, two or more documents may be merged to create a cluster. A similarity calculation may return that two documents should be clustered together based on a list of common words. Other similarity calculations may be used as well that will be known to those skilled in the art. Two clusters may then be clustered together, again based on their similarity. Once all sub-clusters are clustered together, the agglomerative clustering routine is complete.

Figure 2:
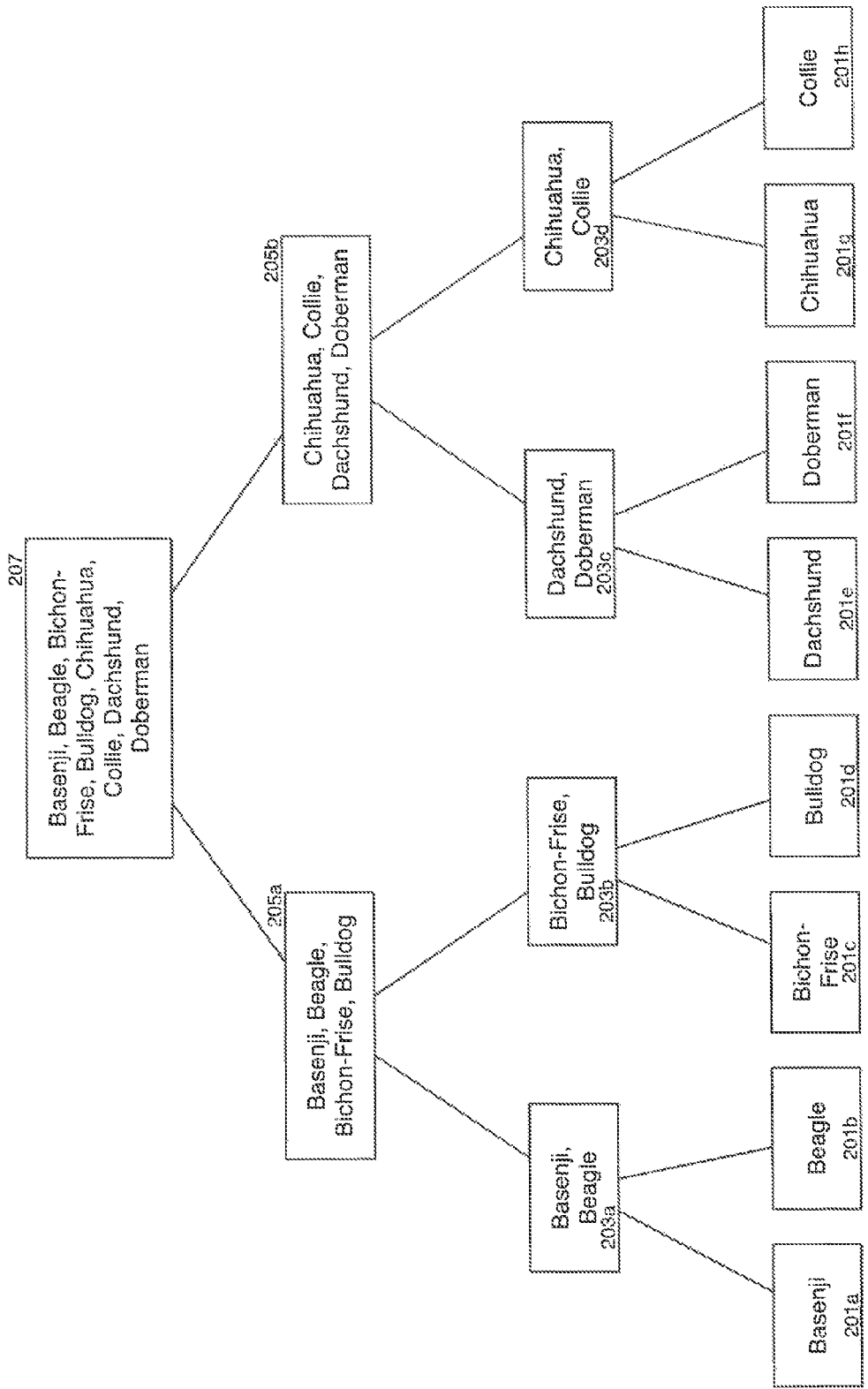
FIG. 2 is an illustration of a cluster hierarchy created as a result of an agglomerative clustering approach.

An example of an agglomerative clustering routine may be shown using the tree structure of FIG. 2. At the bottom level 201, eight words 201a-201h exist, each a particular dog breed. In this example, similarity is based on alphabetical ordering. Clusters are formed with the elements that are most similar to one another. Thus, based on their similarity to each other, the eight words are may be clustered together into four clusters at level 203, forming sub-trees with nodes 203a-203d as the roots of the sub-trees. The four clusters are then clustered into two clusters, again based on similarity, at level 205, forming two further sub-trees with nodes 205a and 205b as the roots of the sub-trees. Finally, the two intermediate clusters are clustered together into one root cluster at level 207 to form the overall tree hierarchy.

An advantage of agglomerative clustering routines is that a number of clusters need not be specified before the clustering operation takes place. Further, a representation of an agglomerative clustering routine may be browsed, in that one can follow how a particular document is clustered throughout the hierarchy. In the example above, a user can follow word 201b through the hierarchy. If a particular cluster level exhibits undesirable results, for example, if two documents are clustered together that are not similar enough, the resulting hierarchy can be cut at that point such that the clusters are cohesive. Agglomerative routines are also considered superior to partitional clustering routines in terms of how cohesive related clusters are. Cohesiveness is measured as the similarity between all elements of a particular cluster, and may use the cosine similarity calculation detailed above, or any other similarity calculation.

However, agglomerative clustering routines are slow in execution time, particularly with large sets of data. Agglomerative clustering routines, at their best, have a time complexity that is exponentially related to the number of documents to be clustered.

Agglomerative clustering similarity measures include single-link and/or complete-link clustering. In single link clustering, the similarity between two clusters is computed as the similarity of the members of the two clusters that are the most similar to each other. Thus, to build a hierarchy, the distances between all elements are calculated. The elements that are closest to each other form a cluster of two elements for each singular element. At the next level, the similarity between two clusters of two elements is calculated, and the closest or most similar clusters are merged to create a new cluster. This process repeats until a specified stopping level (such as when a maximum number of documents per cluster is reached), or until all documents are clustered together in one cluster of all documents.

In complete-link clustering, the similarity between two clusters is computed as the similarity of the two clusters' most dissimilar elements. In other words, the two clusters or elements to be merged have the greatest distance between the two most dissimilar elements. As described in single link clustering, the distances between all elements are calculated. In complete link clustering, elements that are most dissimilar form a cluster of two elements, and this step repeats for each cluster until a hierarchy is formed.

Top-down clustering may also be known as divisive or partitional clustering. Top-down clustering starts with the entire set of data to be clustered, and a number of clusters to be created is specified. Based on the data in the set, clusters may be formed by partitioning the set at a particular point or points. The results of the partition may then be partitioned themselves, until the routine terminates when it has reached the previously specified number of clusters.

To partition one set into two or more clusters, partitional clustering often employs a clustering sub-routine. One such clustering sub-routine is known as k-means clustering. K-means clustering attempts to partition a set of observations or a set of data into k clusters, where each element of the set of data belongs to the cluster with the nearest mean or average. The mean is calculated as the center of the data points in the particular cluster.

In general, for k-means clustering, k initial means or points are randomly selected from the set of documents. Clusters are created by associating documents most similar to the initially selected means into one cluster. After associating documents with the closest means, the center of each cluster is calculated. The center of each cluster is known as the centroid. Documents closest to each centroid are associated with the centroid to create new clusters. The process repeats, calculating new centroids each iteration, until a particular stopping condition occurs. The stopping condition may be that the centroids do not change from iteration to iteration, or that a certain number of iterations has occurred.

To create a partitional cluster hierarchy using k-means, k may be set to 2. Thus, two initial means or points are randomly selected from the data set. Clusters are created by associating each data point in the set with the nearest initial mean. Distance may be calculated using cosine similarity as described above or any other similarity measure. The centroid of each cluster is calculated. This centroid becomes the new mean around which to cluster the data points into two new clusters. Then, k clusters are created by again associating each data point in the set with the nearest initial mean. The step of calculating new means and associating data points with means are repeated until the stopping condition. This ensures that the selected mean and the clusters are optimal. To create the hierarchy, the k-means routine repeats recursively on each of the two clusters, with k set to 2 again, until a hierarchy is created. These divided clusters are connected to their initial clusters to form a hierarchy.

Figure 3:
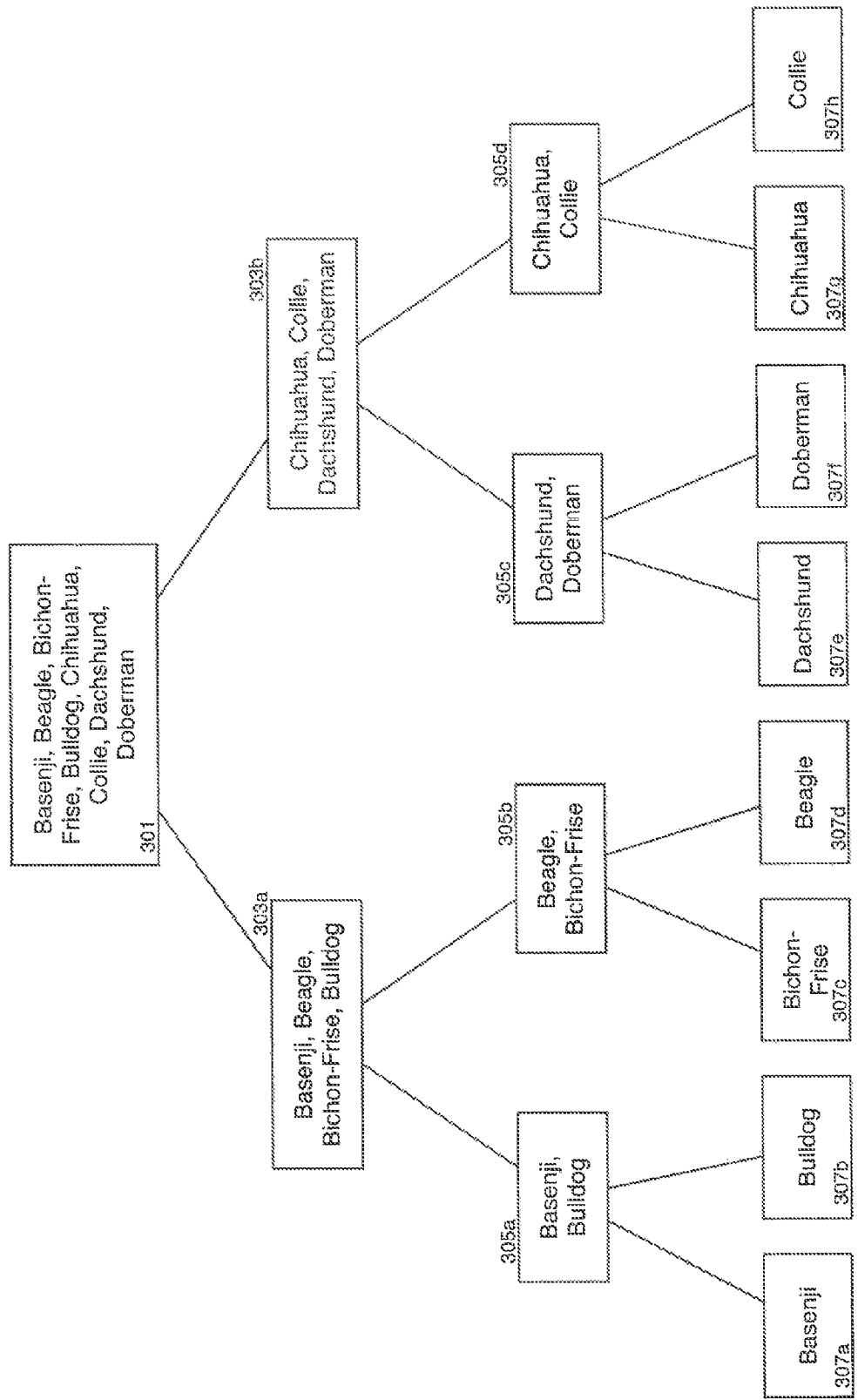
FIG. 3 is an illustration of a cluster hierarchy created as a result of a partitional clustering approach.

An example of a partitional clustering routine may be shown using the tree structure of FIG. 3. At the root 301 of the tree hierarchy, a set of eight documents is to be clustered. At each level 303, 305, and 307, k is chosen to be 2, which allows the set of documents to be partitioned and represented as a binary tree. The root of 8 documents is partitioned into two sets. Those two sets are each partitioned into two sets, forming sub-trees. This step is repeated until the routine terminates with each document representing a cluster. Although the document sets of FIG. 2 and FIG. 3 are identical, the different clustering routines may result in different created hierarchies. This can be seen at level 305, where the clusters of two documents each are slightly different than the clusters at level 203 of FIG. 2.

Partitional clustering routines have the advantage of being easier to implement than agglomerative clustering, and are generally faster in execution time than agglomerative clustering. K-means clustering, for example, has a time complexity that is linearly related to the number of documents to be clustered and the value chosen for k. However, partitional clustering routines may not provide results that are as accurate as agglomerative clustering routines. The results of a k-means clustering process often depend on good initial means being selected for each cluster. If the initial means is not optimal, clusters may not provide optimal results. As shown with respect to FIG. 3, clusters 307a and 307b may not be as cohesive as an agglomerative clustering routine's clusters.

As described above, both agglomerative and partitional clustering routines have their respective advantages and disadvantages. Partitional clustering routines are faster on large sets of data than agglomerative routines, while agglomerative routines may provide more accurate clustering results.

In terms of mathematical complexity, the best agglomerative clustering routines execute on the order of exponential time. In computer science, using Big O notation, this is known as $O(n^2)$ time, where n is the number of documents in the set to be clustered. As an example, assuming an agglomerative clustering routine takes 1 micro-second per document to execute (0.000001 seconds), clustering 1 million documents using the best agglomerative clustering routines would take on the order of $10^6$ seconds, or over 10 days. In a document review environment, a set containing 1 million documents may be typical. Thus, agglomerative clustering routines may be too time-intensive on large document sets to be useful in a document review environment.

The fastest partitional clustering routines execute in linear time, such as k-means described above. Using Big O notation, this may be known as $O(kn)$ time, where n is the number of documents in the set to be clustered and k is the amount of clusters to create. Using similar figures, if a partitional clustering routine takes a tenth of a second per document to execute (0.1 seconds), and five clusters are created clustering 1 million documents using a partitional clustering routine would take slightly over five days to execute. Even with a far slower clustering routine, the partitional clustering routine takes half of the time that an agglomerative routine would for the same data.

Actual performance of each clustering routine may vary with the implementation used. However, in nearly all instances, a partitional clustering routine will execute faster over the same amount of data than an agglomerative clustering routine will. Thus, in an embodiment, multiple clustering routines are executed to create superior results.

Figure 4:
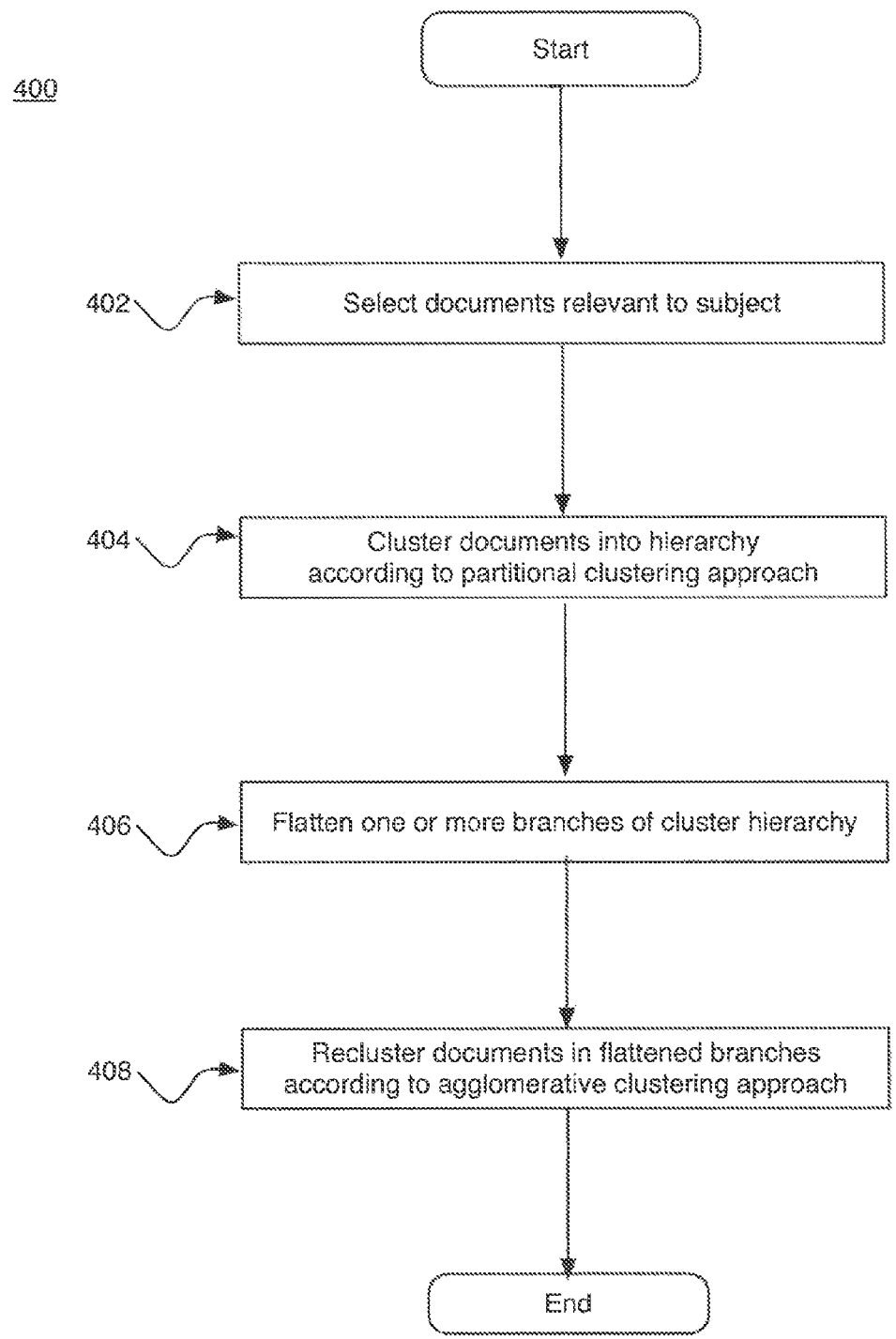
FIG. 4 is a flow diagram of a method for clustering documents in accordance with an embodiment.

FIG. 4 is an illustration of a method 400 for a method of clustering documents identified to be relevant to a subject in accordance with an embodiment. At block 402, a set of documents identified as potentially being relevant to a subject are selected. The documents may be text documents, spreadsheets, electronic mail messages, presentations, or any other type of electronic document. The documents may be stored in a database, on a storage device, or on a plurality of storage devices.

At block 404, the documents identified in block 402 are clustered into a hierarchy according to a partitional clustering approach. The created hierarchy may be represented as a tree structure with multiple branches. Each branch contains either a sub-tree or a leaf node. A leaf node may represent either a singular document or a cluster of documents. A sub-tree is a collection of nodes in a tree structure. Documents may be clustered together based on the similarity of data contained in various fields of the document. For example, electronic mail messages may be clustered based on the similarity of their subject fields. Text documents may be clustered together based on the similarity of the text contained in the document.

At block 406, one or more branches of the cluster hierarchy are flattened. Flattening a branch may be known as recreating a divided cluster by combining the clusters that resulted after its division. Branches may be selected to be flattened if the cohesiveness of the divided clusters falls below a particular defined threshold. For example, cosine similarity may provide a measure of cohesiveness of a cluster. Thus, if the cohesiveness of a divided cluster falls below a certain number, the branch may be selected for re-clustering. Alternatively, a user may review the results of the cluster hierarchy that is created, and identify particular branches or clusters that require re-clustering in order to give a superior result. Also, a number of branches may always he flattened in order to reap the benefits of an agglomerative clustering approach. For example, it may be specified that the cluster hierarchy is always flattened at the (n-2) level, where n is the number of levels in the cluster hierarchy.

At block 408, the flattened branches are then re-clustered according to an agglomerative clustering approach. Any agglomerative clustering routine may be used, depending on the implementation chosen. For example, a particular user may use single-link clustering or complete-link clustering. Again, documents may be clustered together based on the similarity of data contained in various fields of the document. The agglomerative clustering approach re-clusters the flattened branches into a further hierarchy.

Figure 5A:
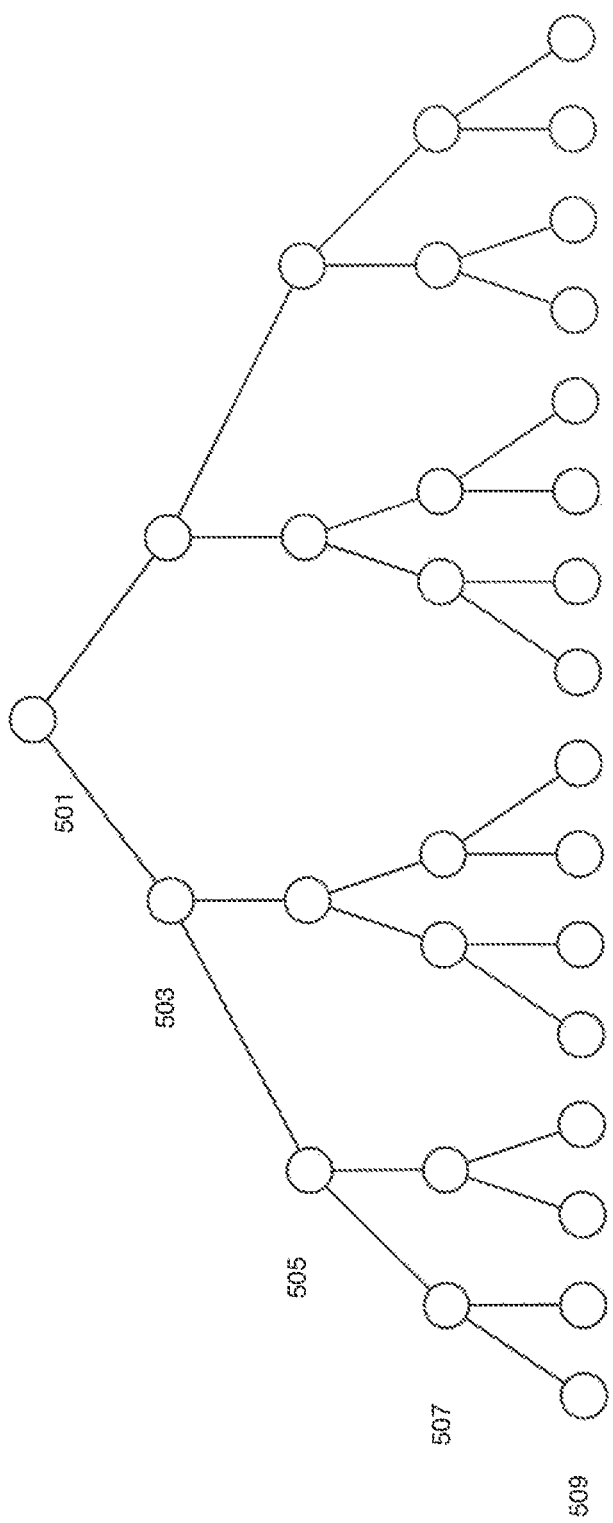
FIG. 5A is an example of an execution of a method in accordance with an embodiment.

Since partitional clustering routines work faster over large sets of data, the set of documents may be initially clustered in accordance with block 404 of method 400 using, for example, k-means clustering. A cluster hierarchy such as the one shown in FIG. 5A may be the result of the partitional clustering utilizing a k-means routine. As explained above, this operation executes in a smaller amount of time than a comparable agglomerative clustering routine over the same set of data.

Figure 5B:
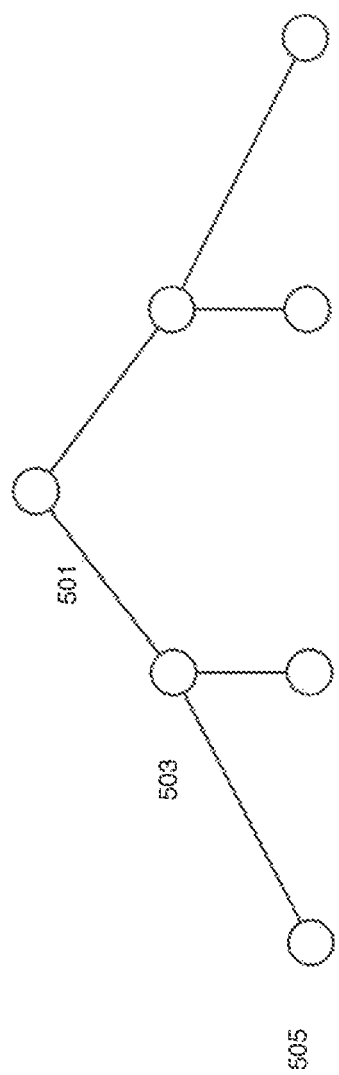
FIG. 5B is an example of an execution of a method in accordance with an embodiment.

However, in order to benefit from the advantages of agglomerative clustering, a user may want to execute such an routine. In order to do so, a level or levels of the cluster tree may be selectively flattened. For example, in a cluster tree with 5 levels, shown in FIG. 5A, the levels contain 1, 2, 4, 8, and 16 clusters per level, respectively. Flattening the bottom two levels of this cluster tree would effectively end the tree at the 4 cluster level. For example, if the clusters in level 507 and 509 are not sufficiently cohesive as a result of a partitional clustering routine, those levels may be flattened up to level 505. The result of such a flattening operation is shown in FIG. 5B.

Figure 5C:
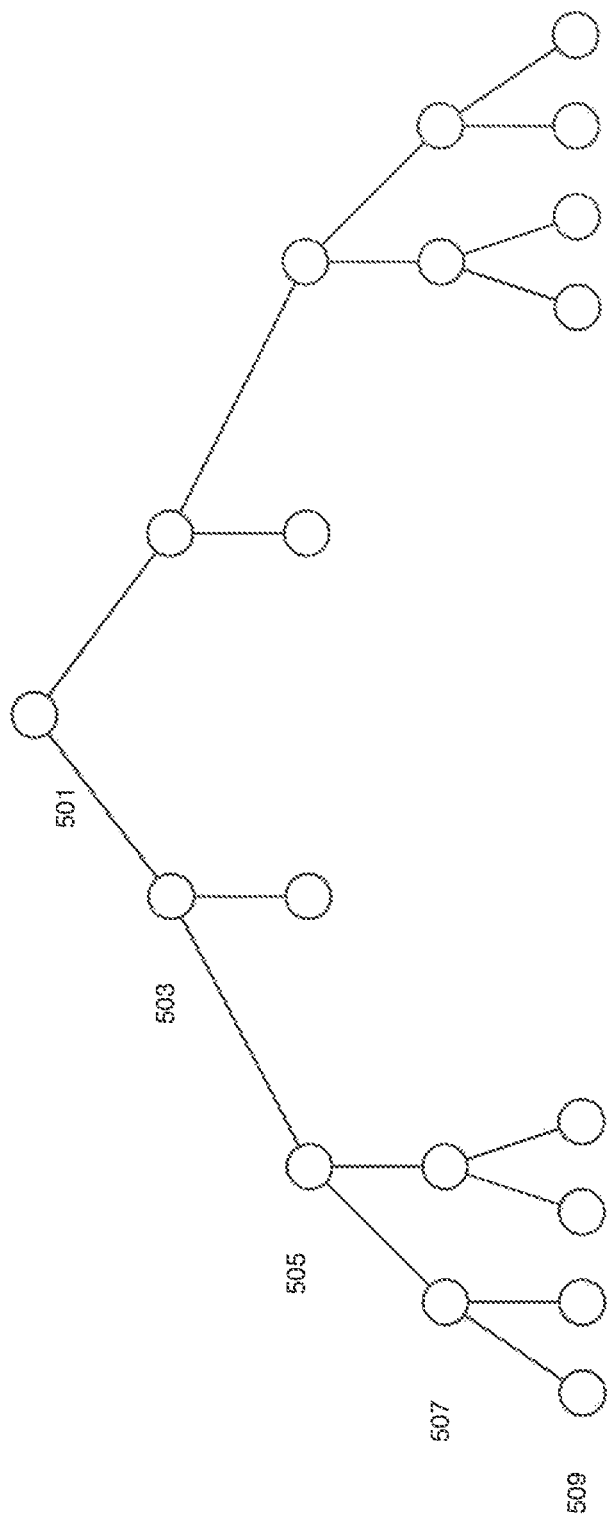
FIG. 5C is an example of an execution of a method in accordance with an embodiment.

As detailed above, the level of cluster to be flattened may be decided according to pre-determined criteria. For example, if the similarity between documents in a particular cluster falls below a certain threshold, the cluster may be selected for flattening. Alternatively, a particular level of a cluster hierarchy may always be flattened so that the agglomerative clustering routine is always executed. For example, the bottom two or bottom three levels of a hierarchy may always be flattened to execute an agglomerative clustering routine on those clusters. In an embodiment, the entire level is not flattened. Rather, only those selected sub-trees and clusters that fall below a particular cohesiveness threshold may be flattened. For example, in FIG. 5C, only selected branches at level 507 and 509 are flattened.

For example, in a partitional clustering sub-routine such as k-means, the k-means clustering sub-routine may be executed with k=2 to create 12 levels of clusters (i.e., a binary tree consisting of 12 levels). Based on a review of the hierarchy and the resulting clusters, a user may determine that clusters at the bottom three levels do not exhibit a high degree of similarity. That is, at levels 1 through 9, the clusters may properly group similar documents together. However, at levels 10, 11, and 12, documents contained in each cluster may not be similar to each other, or rather, documents in different clusters may be more similar to each other than documents in the same cluster.

In order to make the clusters contained at levels 10, 11, and 12 more cohesive, an agglomerative clustering routine may be executed on the documents in each of the clusters at level 9. As detailed above, agglomerative clustering routine runtimes may be very long on large sets of documents. However, because each agglomerative clustering routine is run on a smaller set of documents, the time required by 9 agglomerative clustering routines on 9 smaller sets of documents is less than the time required by one agglomerative clustering routine on a very large set of documents.

As a numerical example, consider that a set of 65,536 documents have been identified as relevant to a particular subject. These documents may be clustered in order to identify themes, or clustered to be later used in a document review environment. In order to cluster the documents quickly, a partitional clustering routine is used that creates two clusters at each level. Assume that at each level of the hierarchy, each cluster contains the same amount of documents. Thus, at level 2, each of the two clusters contains 32,678 documents. At level 3, each of the four clusters contains 16,384 documents, and so on.

At level 9, each document cluster contains 256 documents. At level 10, each document cluster contains 128 documents, while each cluster in level 11 contains 64 documents and each cluster in level 12 contains 32 documents.

Assuming a clustering routine takes 0.01 seconds per document to execute, in accordance with the time complexity explained above, at each level of the hierarchy, the partitional clustering operation may take approximately 1310 seconds per level, or 15,720 seconds to generate the entire tree. A comparable agglomerative clustering routine may take 515,396,075 seconds to execute for the entire hierarchy.

Upon review of the clusters at levels 10, 11, and 12, a user may identify that the clusters at those levels lack cohesiveness, or are not clustered well. The documents in those clusters may exhibit a low cosine similarity or other measure of similarity. Thus, the user may desire an agglomerative approach to clustering documents at those levels to improve the cohesiveness of the clusters.

Re-clustering using an agglomerative approach at level 9 then, where each cluster contains 265 documents, at 0.01 seconds per document, takes 655 seconds per cluster, or 5240 seconds for all clusters in the level. Further clustering at level 10, where each cluster contains 128 documents, at 0.01 seconds per document, takes 163 seconds per cluster, or 2608 seconds for all clusters in the level. Clustering at level 11 takes 40 seconds per cluster or 1310 seconds for all clusters in the level, and clustering at level 12 takes 10 seconds per cluster or 640 seconds for all clusters in the level.

Thus, adding the times necessary for partitional clustering to level 12, flattening to level 9, and re-clustering according to agglomerative clustering to level 12 again results in a time of 25,518 seconds for the entire tree. Compared to agglomeratively clustering the entire tree, which takes 515,396,075 seconds as explained above, the hybrid approach in accordance with method 300 is nearly 20,000 times faster than agglomerative clustering alone.

In an embodiment, the step of performing an agglomerative clustering approach may be done in parallel on multiple machines. For example, if the flattened cluster tree results in nine clusters to be further clustered with an agglomerative approach, as in the example above, nine machines may each operate on one cluster such that the operation may complete in $\frac{1}{9}^{th}$ of the time that it would if the operation were completed on one singular machine.

Because the amount of data in each cluster at the flattened level is less than the amount of data at the top level, an agglomerative clustering operation may be executed on the individual flattened clusters. The agglomerative approach may result in more useful clusters than if the initial partitional clustering method were used for the entire tree.

As explained with respect to application U.S. patent application Ser. No. 13/530,262, filed Jun. 22, 2012, titled Clustering E-mails Using Collaborative Information, incorporated herein by reference in its entirety, clustering on data contained in non-content parameters of an electronic document may be faster than clustering on content data. Thus, in an embodiment, clustering according to a partitional approach is done on data contained in non-content parameters, as described with respect to block 402 of method 400. In a further embodiment, the re-clustering operation done according to an agglomerative approach may be done on data contained in content parameters of a document to form more cohesive clusters.

In an embodiment, a maximum number of documents per cluster at the completion of the re-clustering operation may be received. For example, in order to provide a manageable set of documents to review for a litigation, 1000 documents may be set as the maximum number of documents per cluster.

In an embodiment, a maximum tree depth level may be received for the initial or the second clustering operation. Tree depth may be measured using the number of steps or connections from the root of the hierarchy to the leaf nodes. For example, a user may desire that the partitional clustering hierarchy terminate after twelve levels. Additionally, the maximum tree depth level for the agglomerative clustering portion of method 400 may be received. For example, the agglomerative clustering operation may terminate after a sub-tree depth of 3 to ensure that an agglomerative clustering operation completes in a desired amount of time.

In an embodiment, documents to be clustered may not be located in a single database. Instead, documents may be distributed across a plurality of clients, such as in a hosted user environment utilizing distributed storage. Thus, in an embodiment, clustering may be performed on a set of documents distributed across a plurality of client devices.

In an embodiment, a maximum or minimum number of levels to flatten may be received as well. For example, based on knowledge of a particular partitional clustering method, a user may identify that the particular partitional clustering method used creates desirable clusters until a certain level, such as the tenth level of a binary tree, but subsequent levels are undesirable. Therefore, in an embodiment, a cluster hierarchy may always be flattened at a particular level. Additionally, as stated above, a maximum number of levels to be flattened may be received.

Once the hierarchy is clustered and re-clustered according to various embodiments described herein, the resulting clusters may be filtered in accordance with specified filter criteria. For example, a cluster may represent a group of e-mails responsive to a particular subject. The cluster can then be further filtered according to desired criteria to present a smaller set of responsive documents for review or other purposes.

The clustering approaches described herein can be implemented in software, firmware, hardware, or any combination thereof. The cluster approaches may be implemented to run on any type of processing device including, but not limited to, a computer, workstation, distributed computing system, embedded system, stand-alone electronic device, networked device, mobile device, set-top box, television, or other type of processor or computer system.

Figure 6:
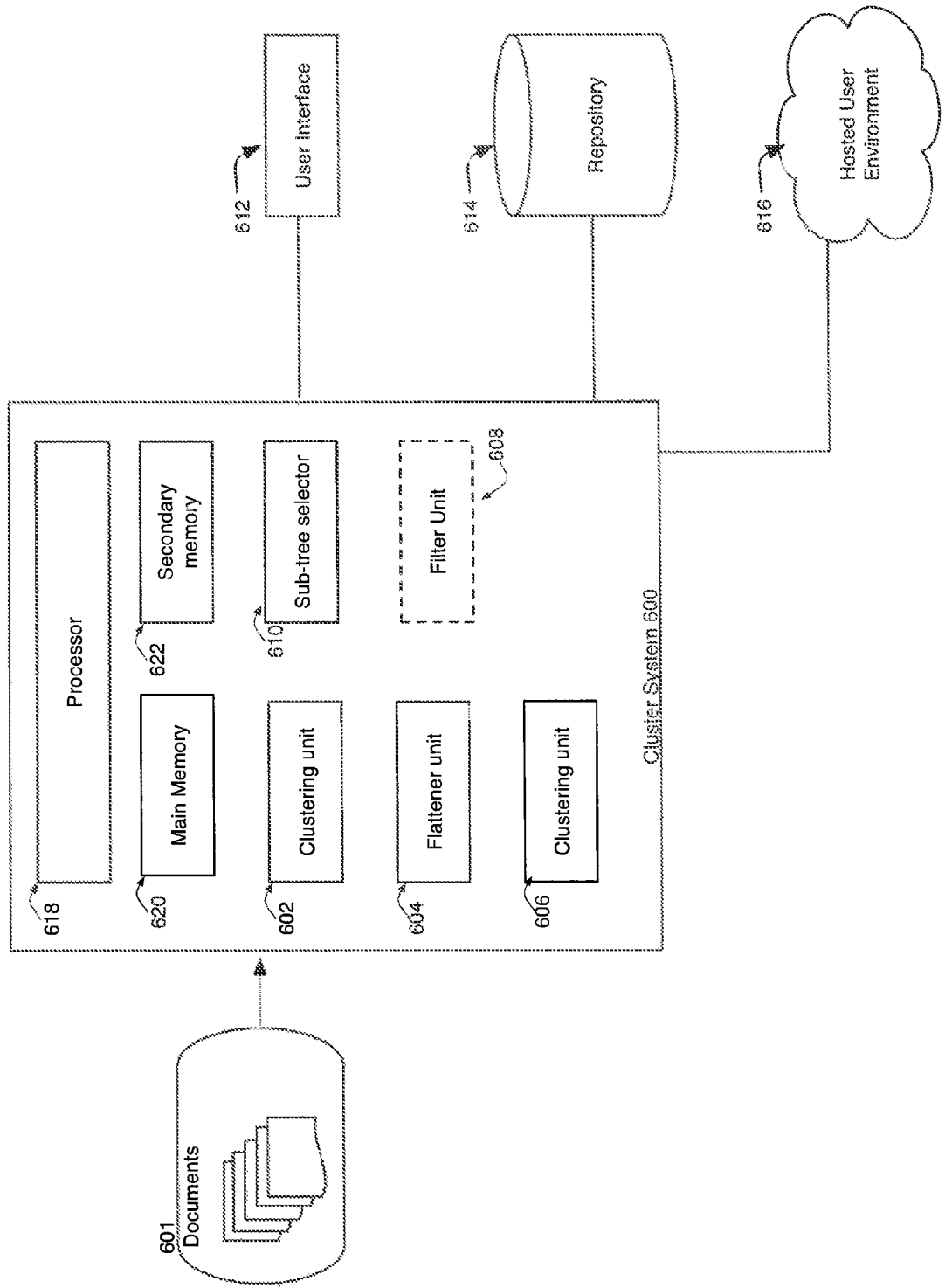
FIG. 6 is an illustration of a system in accordance with an embodiment.

FIG. 6 is an illustration of a cluster system 600 used to implement embodiments described herein. Documents 601 relevant to a subject may be provided to cluster system 600. Documents 601 may be provided from a database or other repository implemented in hardware, software, firmware, or a combination thereof.

Cluster system 600 contains a first clustering unit 602. Clustering unit 602 may be configured to be a partitional clustering unit, and may utilize a k-means clustering routine or another partitional clustering routine to create a cluster hierarchy as described with respect to block 404 of method 400.

Cluster system 600 also contains a flattener unit 604, which selectively flattens one or more branches, sub-trees, or levels created by partitional clustering unit 602. Flattener unit 604 may be adapted to flatten branches, sub-trees or levels according to previously specified criteria. Alternatively, flattener unit 604 may take input from user interface 610 to control which branches, sub-trees or levels are flattened.

Cluster system 600 also contains a second clustering unit 606. Clustering unit 606 may be configured to be an agglomerative clustering unit, and may use single-link, complete-link, or other agglomerative clustering techniques to re-cluster the flattened branches selected by flattener unit 604.

Cluster system 600 may also contain a filter unit 608. Filter unit 608 may take clusters from agglomerative clustering unit 606 and filter data in accordance with an embodiment. For example, filter unit 608 may output documents that satisfy particular criteria.

Cluster system 600 may be connected to a user interface 612. User interface 612 may allow a user to specify to clustering unit 602, configured as a partitional clustering unit, a number of levels to be included in the generated cluster hierarchy. Additionally, user interface 612 may allow a user to control the operation of flattener unit 604. Further, user interface 612 may allow a user to specify filter criteria to filter unit 608.

Document cluster system 600 may further be connected to a repository 614 to store the results of the cluster unit 600.

Repository 614 may be used to store documents for a document review system. Document cluster system 600 may also be connected to a hosted user environment 616, as described below.

Document cluster system 600 may include one or more processors 618.

Document cluster system 600 may also include a main memory 620, preferably random access memory (RAM), and may also include a secondary memory 622. Secondary memory 622 may include a hard disk drive and/or a removable storage drive for allowing computer programs or other instructions to be executed by processor 618.

In an embodiment, documents to be clustered are distributed across a plurality of clients in a hosted user environment. In a hosted user environment, utilizing a distributed file system, documents are not stored on a central server or on individual user devices. Instead, documents are distributed over multiple storage machines connected to a network. In this embodiment, a system such as the system described in FIG. 6 may be connected to the network of the hosted user environment to enable clustering and further analysis of documents in a hosted user environment.

In an embodiment, a re-clustered sub-tree or sub-trees may be exported to a document review tool. Such a tool may allow a reviewer, such as a member of a company's legal department, to view a highly cohesive cluster of documents and perform further analysis, such as tagging documents as responsive to a particular document request or criteria.

In an embodiment, a re-clustered sub-tree or sub-trees may be assigned to a particular reviewer in accordance with an access control policy. For example, if a sub-tree contains a document marked as attorney's eyes only, that sub-tree may automatically be assigned to an attorney in the legal department as opposed to a paralegal. As another example, if a sub-tree contains a large number of technical documents, the sub-tree may be assigned to a reviewer with technical expertise.

In an embodiment, a maximum or minimum number of documents per cluster may be specified. Thus, when either the first or the second clustering operation occurs, if a maximum number of documents is specified, the clustering operation continues until created clusters are under the maximum number. Similarly, if a minimum number of documents is specified, the clustering operation may cease once a particular cluster falls below that minimum number.

In an embodiment, the clusters of documents that result after the initial and subsequent re-clustering of documents may be exported to a document review tool. Thus, documents may be grouped for easier review, so that reviewers may be able to focus on one discrete issue at a time. Additionally, documents relating to a particular topic may be clustered together, and exported to a particular reviewer with previous experience with the topic.

Various aspects of the present invention can be implemented by software, firmware, hardware, or a combination thereof. Embodiments may be implemented in hardware, software, firmware, or a combination thereof. Embodiments may be implemented via a set of programs running in parallel on multiple machines. In an embodiment, different stages of the described methods may be partitioned according to, for example, the number of documents to be clustered, and distributed on the set of available machines.

The summary and abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but rather is defined by the following claims and their equivalents.

What is claimed is:

1. A method of filtering a set of documents considered to be relevant to a subject, comprising:
    selecting a set of documents determined to be relevant to a subject;
    clustering, by a processing device, the set of documents into a hierarchy of clusters based on a partitional clustering approach, the cluster hierarchy comprising a tree structure having a plurality of branches, each branch having at least one of a leaf node or a sub tree, wherein the clustering comprises dividing the set of documents into a number of clusters of the hierarchy;
    flattening, by a processing device, one or more branches of the cluster hierarchy, wherein the flattening comprises recreating a cluster that was divided by combining two or more clusters that resulted from the cluster's division; and
    re-clustering, by a processing device, documents in the flattened branches based on an agglomerative clustering approach to form a modified cluster hierarchy, wherein when more than one flattened branch is selected for re-clustering, each flattened branch is re-clustered in parallel with other flattened branches, and wherein the modified cluster hierarchy includes clusters formed by partitional clustering and clusters formed by agglomerative clustering.

2. The method of claim 1, wherein the step of flattening one or more branches of the cluster hierarchy occurs when the cohesiveness of a cluster in a particular branch falls below a threshold.

3. The method of claim 1, wherein the set of documents is distributed across a plurality of client devices in a hosted user environment.

4. The method of claim 1, further comprising receiving a maximum tree depth level; and clustering, by a processing device, documents in the set of documents into a hierarchy according to a partitional clustering approach to the received maximum tree depth level.

5. The method of claim 1, further comprising receiving a number of levels of the cluster hierarchy to be flattened; and flattening, by a processing device, one or more branches of the cluster hierarchy at the received number of levels.

6. The method of claim 1, further comprising receiving a maximum number of documents per flattened branch; and flattening, by a processing device, one or more branches of the cluster hierarchy wherein each flattened branch contains fewer than the received maximum number of documents per flattened branch.

7. The method of claim 1, further comprising filtering one or more re-clustered branches in accordance with received filter criteria.

8. The method of claim 1, wherein the step of clustering documents in the set of documents into a hierarchy according to a partitional clustering approach is performed based on one or more non-content fields.

9. The method of claim 1, wherein the step of re-clustering the flattened branches according to an agglomerative clustering approach is performed based on one or more content fields.

10. The method of claim 1, wherein the flattening comprises combining the one or more clusters of the one or more branches into fewer, less divided clusters.

11. The method of claim 1, wherein after the re-clustering, the hierarchy includes a first set of clusters generated based on the partitional clustering approach and a second set of clusters generated based on the agglomerative clustering approach, wherein the first set of clusters includes documents that were partitionally clustered but not agglomeratively clustered, and wherein the second set of clusters includes documents that were both partitionally clustered and agglomerative clustered.

12. The method of claim 1, wherein a first number of documents in the set of documents on which the partitional clustering approach is used is larger than a second number of documents in the flattened clusters on which the agglomerative clustering approach is used.

13. A system for clustering a set of documents considered to be relevant to a subject, comprising:
    one or more processors; and
    a storage device having instructions stored thereon that, when executed by the one or more processors, cause the one or more processors to:
    select a set of documents determined to be relevant to a subject;
    cluster the set of documents into a hierarchy of clusters based on a partitional clustering approach, the cluster hierarchy comprising a tree structure having a plurality of branches, each branch having at least one of a leaf node or a sub tree, wherein the clustering comprises dividing the set of documents into a number of clusters of the hierarchy;
    flatten one or more branches of the cluster hierarchy, wherein the flattening comprises recreating a cluster that was divided by combining two or more clusters that resulted from the cluster's division; and
    re-cluster documents in the flattened branches based on an agglomerative clustering approach to form a modified cluster hierarchy, wherein when more than one flattened branch is selected for re-clustering, each flattened branch is re-clustered in parallel with other flattened branches, and wherein the modified cluster hierarchy includes clusters formed by partitional clustering and clusters formed by agglomerative clustering.

14. The system of claim 13, the storage device having further instructions stored thereon that, when executed by the one or more processors, cause the one or more processors to flatten one or more branches of the cluster hierarchy when the cohesiveness of a cluster in a particular branch falls below a threshold.

15. The system of claim 13, wherein the set of documents is distributed across a plurality of client devices in a hosted user environment.

16. The system of claim 13, the storage devices having further instructions stored thereon that, when executed by the one or more processors, cause the one or more processors to:
   receive a maximum tree depth level; and
   cluster documents in the set of documents into a hierarchy according to a partitional cluster approach to the received maximum tree depth level.

17. The system of claim 13, the storage device having further instructions stored thereon that, when executed by the one or more processors, cause the one or more processors to:
   receive a number of levels of the cluster hierarchy to be flattened; and
   flatten one or more branches of the cluster hierarchy at the received number of levels.

18. The system of claim 13, the storage device having further instructions stored thereon that, when executed by the one or more processors, cause the one or more processors to:
   receive a maximum number of documents per flattened branch; and
   flatten one or more branches of the cluster hierarchy, wherein each flattened branch contains fewer than the received maximum number of documents per flattened branch.

* * * * *